June 23, 1936. M. M. O'CONNELL 2,045,307
SUPPORTING APPARATUS FOR PIPES AND THE LIKE
Original Filed Oct. 23, 1933 3 Sheets-Sheet 1

Inventor,
Maurice M. O'Connell,
by Walter P. Geyer
Attorney.

June 23, 1936.  M. M. O'CONNELL  2,045,307
SUPPORTING APPARATUS FOR PIPES AND THE LIKE
Original Filed Oct. 23, 1933   3 Sheets-Sheet 2
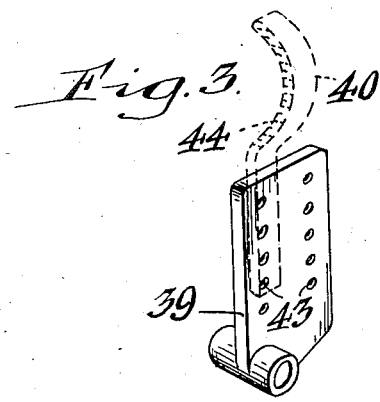
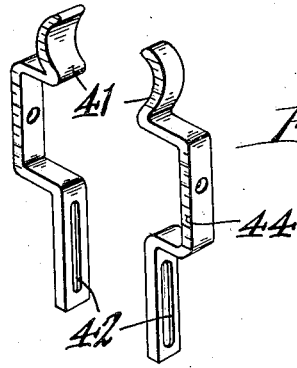
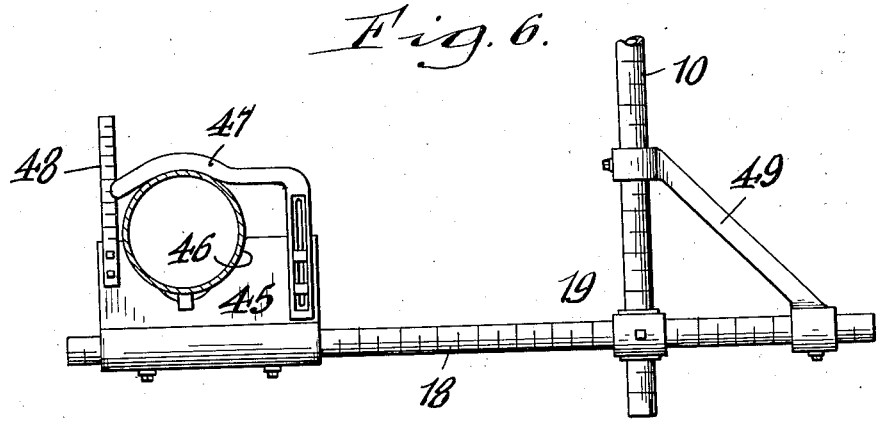
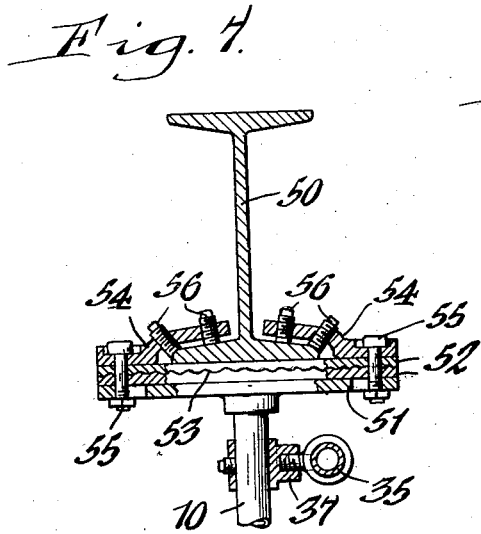
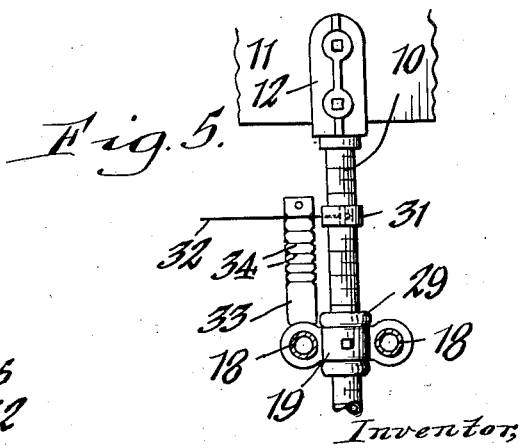
Inventor,
Maurice M. O'Connell,
by Walter P. Geyer
Attorney.

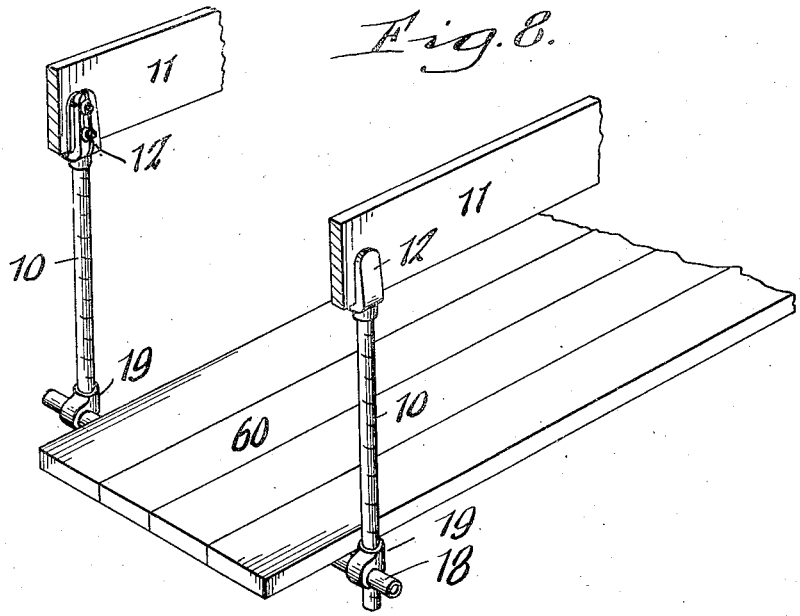
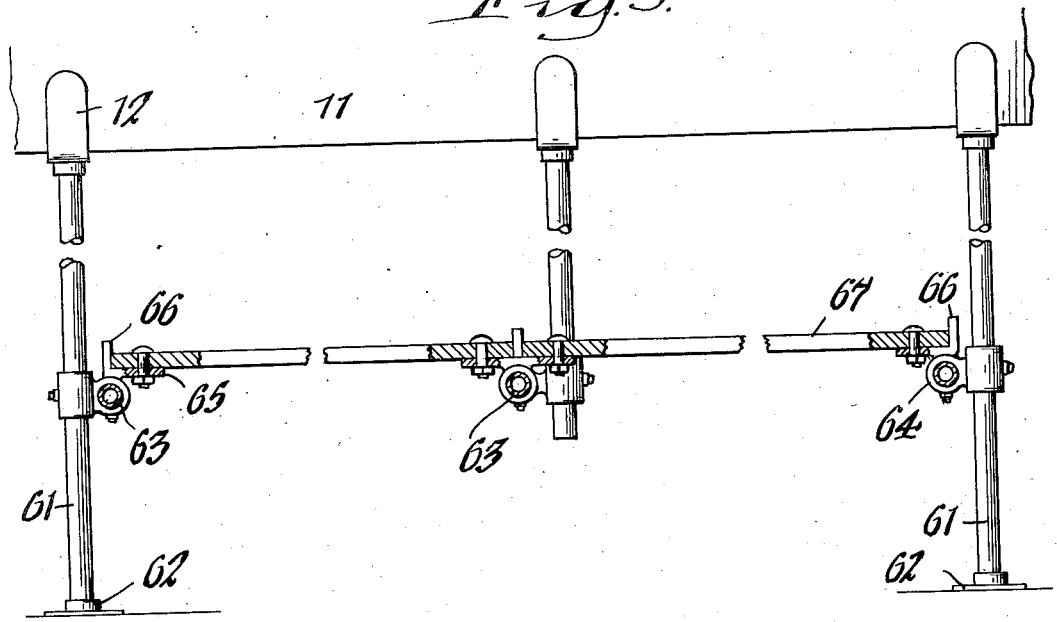

Patented June 23, 1936

2,045,307

UNITED STATES PATENT OFFICE 2,045,307

SUPPORTING APPARATUS FOR PIPES AND THE LIKE

Maurice M. O'Connell, Buffalo, N. Y., assignor of one-half to Lillian Lone, Buffalo, N. Y.

Application October 23, 1933, Serial No. 694,764
Renewed November 21, 1935

1 Claim. (Cl. 248—59)

This invention relates generally to a suspended or pendant supporting apparatus which has been designed more particularly for facilitating the installation of piping in buildings and the like.

One of its objects is the provision of a simple, compact, sturdy and efficient suspension means of this character whereby the installation of piping may be effected with a minimum of effort and in a minimum period of time.

Another object of the invention is the provision of a rugged and readily adjustable suspension means for pipes whereby the pipes may be easily and quickly lined up to meet the varying conditions of installation.

Other features of the invention reside in the construction and arrangement of parts hereinafter described and particularly pointed out in the appended claim.

Figure 1:
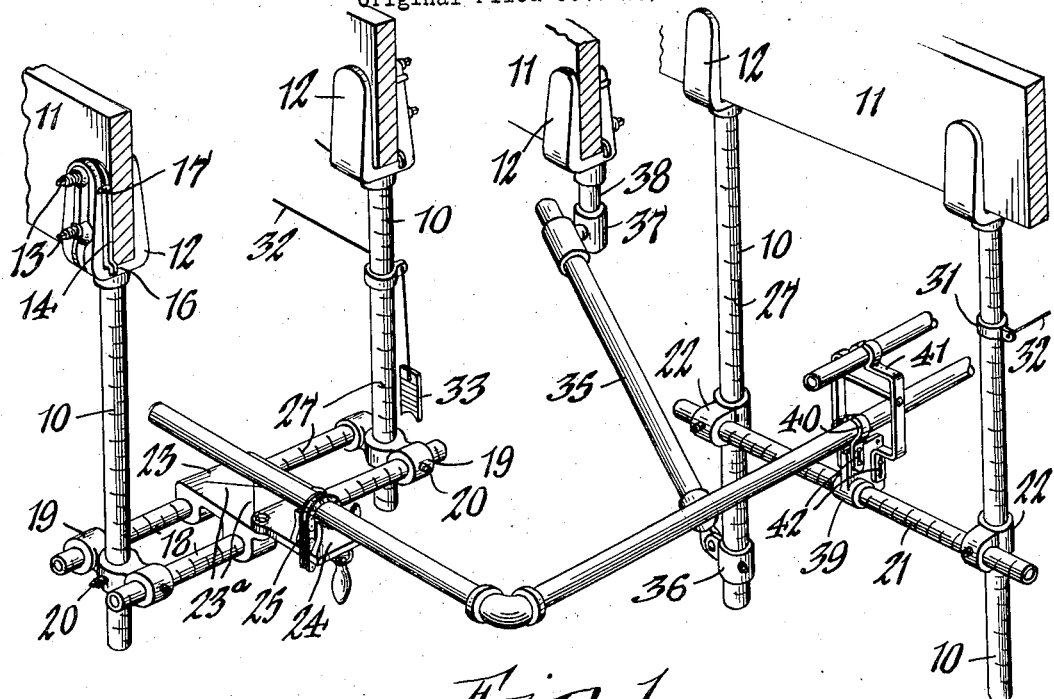
Figure 2:
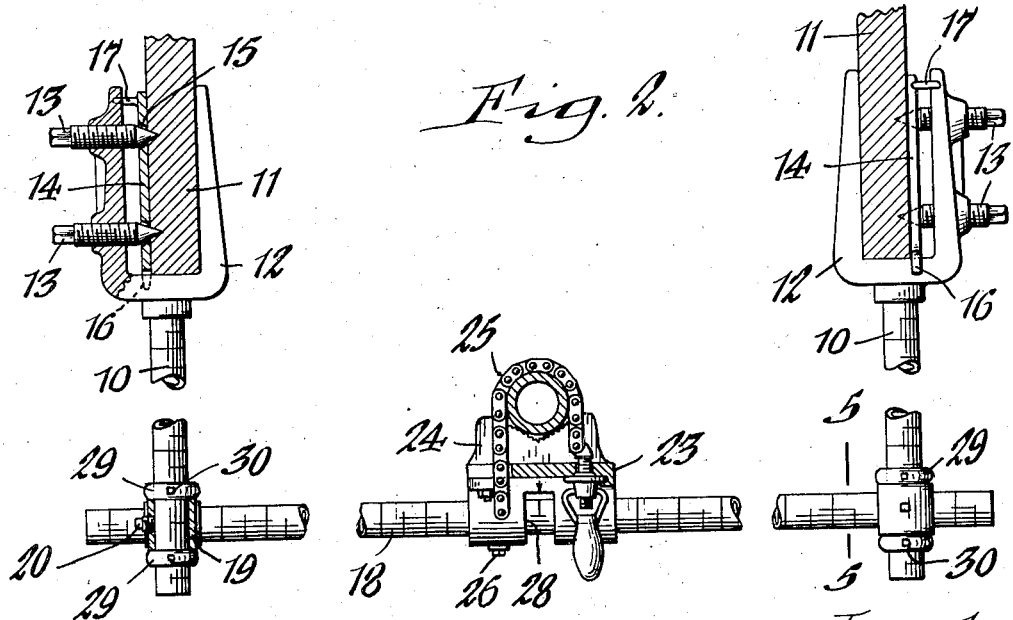

In the accompanying drawings:

Figure 1 is a perspective view of a suspension apparatus, embodying my invention. Figure 2 is an enlarged cross section thereof. Figures 3 and 4 are detached perspective views of certain of the pipe-clamp fittings embodying my invention. Figure 5 is a cross section taken on line 5—5, Figure 2, and having the use of the gage plate in lining up the pipe line. Figure 6 is a front view of a clamp for use in the installation of soil pipe. Figure 7 is a sectional end view of a modified form of suspension bracket for use on I-beams. Figure 8 is a fragmentary perspective view showing my apparatus used as a scaffold. Figure 9 is a sectional side view showing the apparatus set up as a shelving unit.

Similar characters of reference indicate corresponding parts throughout the several views.

In the embodiment of my invention shown in Figures 1 and 2, I provide a plurality of suspension units or scaffolds upon which the piping or other means is adapted to be sustained or supported during its installation, each of these units preferably consisting of upright posts or standards 10, 10 provided at their upper ends with means for detachably securing them to the joists 11 of a building. As shown in Figures 1 and 2, each of these means may consist of a substantially U-shaped bracket or clamp 12 adapted to embrace the lower edge of the joist and provided in one or both of its legs with anchoring bolts 13 which are in threaded engagement with such legs and which are unthreaded and pointed at their ends to penetrate the joist. To adapt each bracket to different widths of joists, a spacer plate or insert 14 is provided which is adapted to abut flatwise against the joist and contains openings 15 through which the pointed ends of the bolts 13 are adapted to extend. To prevent each plate 14 from being dislodged during a given adjustment or during a shifting of the clamp lengthwise of the joist, it is provided at its lower edge with lugs or projections 16 which are adapted to extend downwardly over the adjoining edge of the U-shaped clamp 12, while its upper edge is provided with outwardly-facing projections 17 which are adapted to embrace the corresponding side edges of the adjoining bracket-leg, in the manner shown in Figures 1 and 2.

Disposed transversely between the upright posts 10, 10, for adjustment vertically thereon, is a pipe or like supporting means which may consist, as shown at the left of Figure 1, of a pair of spaced horizontal rods 18, 18, of round, square or other cross-section, supported at their ends in suitable fittings 19 applied to the posts 10 and adjustable vertically thereon, set screws 20 being provided for securely anchoring these fittings in a set position on the posts. At the right hand side of Figure 1, this supporting means is shown consisting of a single horizontal rod 21 mounted in suitable fittings 22 likewise adjustable lengthwise of the pendant posts 10, it being intended to use the signal rod construction in the installation of smaller pipes, and the double rod construction for larger and heavier pipes lines.

Applied to the horizontal rods 18 or 21, is a transversely-adjustable platform 23 which carries a pipe-vise of any appropriate and well known construction, that shown in the drawings including an angular jaw 24 and a chain tongs 25 for securely clamping the pipe in position during the application of T's, L's, unions, collars, pipes, etc., to the pipe being installed and thereby eliminating the necessity of attendants to hold the pipe against rotation. Set screws 26 serve to hold the vise-platform 23 in a set position of adjustment on the rods 18 or 21.

The upright post 10 and transverse rods 18 and 21 are provided with suitable measuring scales or inch graduations 27 for facilitating the proper elevation of the pipe-supporting means and the proper alining of the vise-platforms suspended thereon. As shown in Figure 2, the platform 23 is notched or provided with a rigid opening at 28, whereby the pipe-fitter can readily see the graduation marks on the rods 18 during the transverse adjustment of the platform to line up its vise with that on the adjoining platform.

In addition to the set screws 20 for holding the rod-supporting fittings 19 in a set position on the upright posts 10, abutment collars 29 may be applied to the posts above and below the fittings 19, set screws 30 being provided for anchoring the collars securely in place.

Applied to one of the posts 10 of each suspension unit is a vertically adjustable collar 31 which serves as a means for connecting a chalk line 32 thereto, such chalk line being used to gage the proper level or pitch of a given pipe installation. In order to facilitate the placing of the platform 23 at a desired elevation, particularly in the installation of pipe-lines including pipe sections of different diameters, and still maintain the proper level or pitch of the pipe-line, I provide a gage plate 33 which normally may be detachably suspended, as seen in Figure 1, from the collar 31 so as not to become lost or misplaced. This plate is preferably notched at its side edges and is divided off into graduations 34 corresponding to fractions of a foot and in use is adapted to be engaged at one end with the top side of one of the post-engaging fittings 19, as shown in Figure 5, while its upper portion is adapted to be brought into register at a given graduation mark with the chalk line 32. By the provision of this gage plate, the pipe fitter can readily and conveniently set the support 18 bearing the vise-platform 23 at the desired predetermined elevation on the posts 10 to bring the pipe-section supported thereby in proper alinement with the adjoining pipe section which may be smaller or larger in diameter than the one being lined up.

If desired, means may be provided for bracing the posts 10, and to this end I provide a diagonal brace member 35 which is pivotally connected at the lower end to a suitable collar 36 applied to the post 10 for adjustment vertically thereto, while its upper end is adjustably connected to a swivel fitting 37 applied to a suspension post 38 or like member secured to a joist or other appropriate part of the building.

Applied to the top side of the vise-platform 23 are intersecting lines, grooves or ribs 23ᵃ which are provided as gage marks for facilitating the laying of the pipe at a 45° angle to the straight section.

In Figures 3 and 4, I have shown attachments or fittings particularly adaptable for the installation of pipes in superposed, parallel relation, such an installation being depicted at the right of Figure 1. In these figures, the numeral 39 indicates a support applied to the scaffold-rod 21 for adjustment lengthwise thereof and carrying two sets of pipe-clamps 40 and 41, respectively, the pipe-clamp 40 serving to receive the lower pipe and the pipe-clamp 41 the upper pipe. The upper pipe-clam 41 is so shaped between its ends as to afford ample clearance for the lower pipe, as shown in Figure 1. Both sets of clamps are provided at their lower or attaching ends with longitudinal slots 42 through which bolts or fastening screws pass for securing them to the support 39, a series of bolt-holes 43 being provided in the support for adjusting the clamps at different elevations. As shown in Figures 3 and 4, the pipe clamps 40 and 41 are provided along their edges with suitable scale graduations 44 by which the pipe fitter is aided in correctly placing the respective pipes at the prescribed distance apart.

In Figure 6, I have shown a soil pipe clamp adapted for attachment to a scaffold unit and consisting of a lower portion or member 45 mounted on the horizontal supporting rod 18 or 21 of the scaffold unit and provided in its upper edge with a suitable notch or recess 46 shaped to support soil pipes of different diameters within certain limits. Adjustably mounted on this member for movement toward and from its pipe-receiving recess is a clamping jaw 47 which is adapted to embrace the top side of the pipe and clamp it firmly to the recessed member. A gage bar 48 rising from the rod-engaging member 45 serves to aid the pipe fitter in properly lining up the pipe sections during installation. In practice, this soil pipe clamp is supported from one of the pendant posts 10 and a suitable brace 49 may be employed between said post and the supporting rod 18.

In Figure 7 I have shown means for suspending the upright posts 10 from a steel girder or I-beam 50, such means consisting of a bottom plate 51 to which the suspension post may be screwed or otherwise fastened, superposed beam-supporting plates 52 held against relative shifting by intermeshing corrugations 53, and clamping brackets 54 overhanging the base-flanges of the beam and fastened at their outer ends to the plates 51, 52 by bolts 55. Set screws 56 applied to these clamping brackets and engaging the beam-flanges serve to anchor the suspension means to the beam.

My improved suspension unit or scaffold is also readily adaptable for use as an elevated platform or for storage racks or shelving. Such uses are depicted in Figures 8 and 9, respectively, Figure 8 showing the apparatus set up as a suspended platform with planks 60 supported on the cross rods 18. In Figure 9, showing a shelving assembly, the posts 61 are secured at their upper ends to joists and at their lower ends to floor-plates 62. Applied to the cross rods 63 are suitable fittings 64 having horizontal and vertical flanges 65 and 66, respectively, with which the shelves 67 are adapted to engage.

I claim as my invention:—

An apparatus for use in the installation of pipe lines in buildings and the like, comprising a plurality of units each consisting of a pair of pendant posts having means at their upper ends for detachably securing them to an overhead support, fittings mounted on said posts and adjustable lengthwise thereof, supporting means disposed between said posts and attached at their ends to said fittings, a platform mounted on said supporting means for adjustment thereon between the posts, and means on said platform for clamping a pipe thereto.

MAURICE M. O'CONNELL.